(12) United States Patent
Lee et al.

(10) Patent No.: US 12,084,793 B2
(45) Date of Patent: Sep. 10, 2024

(54) HYBRID TIRE CORD AND METHOD FOR MANUFACTURING THEREOF

(71) Applicant: KOLON INDUSTRIES, INC., Seoul (KR)

(72) Inventors: Min Ho Lee, Seoul (KR); Ok Hwa Jeon, Seoul (KR); Jongha Yim, Seoul (KR)

(73) Assignee: KOLON INDUSTRIES, INC., Seoul (KR)

( * ) Notice: Subject to any disclaimer, the term of this patent is extended or adjusted under 35 U.S.C. 154(b) by 344 days.

(21) Appl. No.: 17/635,780

(22) PCT Filed: Sep. 23, 2020

(86) PCT No.: PCT/KR2020/012881
§ 371 (c)(1),
(2) Date: Feb. 16, 2022

(87) PCT Pub. No.: WO2021/066385
PCT Pub. Date: Apr. 8, 2021

(65) Prior Publication Data
US 2022/0307162 A1  Sep. 29, 2022

(30) Foreign Application Priority Data

Sep. 30, 2019  (KR) .................. 10-2019-0121169

(51) Int. Cl.
*D02G 3/48* (2006.01)
*D02G 3/04* (2006.01)
*D02G 3/28* (2006.01)

(52) U.S. Cl.
CPC .............. *D02G 3/48* (2013.01); *D02G 3/047* (2013.01); *D02G 3/28* (2013.01); *D10B 2331/021* (2013.01); *D10B 2331/04* (2013.01); *D10B 2505/022* (2013.01)

(58) Field of Classification Search
CPC .......... D02G 3/045; D02G 3/047; D02G 3/28; D02G 3/40; D02G 3/404; D02G 3/48
See application file for complete search history.

(56) References Cited

U.S. PATENT DOCUMENTS

| | | | | |
|---|---|---|---|---|
| 4,155,394 | A * | 5/1979 | Shepherd | B60C 9/005 57/238 |
| 9,617,663 | B2 * | 4/2017 | Jeon | D02G 3/40 |
| 9,789,731 | B2 * | 10/2017 | Lee | B60C 9/005 |
| 10,196,765 | B2 * | 2/2019 | Jeon | D02G 3/48 |
| 11,639,565 | B2 * | 5/2023 | Lee | D02G 3/48 57/237 |
| 2009/0090447 | A1 * | 4/2009 | Baldwin, Jr. | B60C 9/005 152/451 |
| 2013/0025758 | A1 * | 1/2013 | Kim | B60C 9/005 152/451 |
| 2013/0167503 | A1 * | 7/2013 | Han | D02G 3/288 19/145.5 |
| 2014/0237983 | A1 * | 8/2014 | Love | D02G 3/04 57/58.7 |
| 2014/0238524 | A1 * | 8/2014 | Love | F16L 11/02 138/118 |
| 2015/0292124 | A1 * | 10/2015 | Lee | D02G 3/48 57/296 |
| 2016/0376733 | A1 * | 12/2016 | Jeon | D02G 3/40 57/237 |
| 2018/0017191 | A1 * | 1/2018 | Love | D02G 3/28 |

FOREIGN PATENT DOCUMENTS

| | | |
|---|---|---|
| CN | 102899768 A | 1/2013 |
| CN | 104755663 B | 12/2017 |
| DE | 102017215655 A1 | 3/2019 |
| JP | 2007245811 A | 9/2007 |
| JP | 2009127152 A | 6/2009 |
| JP | 2010012828 A | 1/2010 |
| JP | 2016506453 A | 3/2016 |
| JP | 2016060343 A | 4/2016 |
| JP | 2016537243 A | 12/2016 |
| JP | 2017014678 A | 1/2017 |
| JP | 2018094979 A | 6/2018 |
| KR | 20000050439 A | 8/2000 |
| KR | 20060104503 A | 10/2006 |
| KR | 101602605 B1 | 3/2016 |
| KR | 1020170088626 A | 8/2017 |
| KR | 1020180035400 A | 4/2018 |
| KR | 20180063922 A | 6/2018 |
| KR | 1020180063924 A | 6/2018 |

OTHER PUBLICATIONS

International Search Report dated Jan. 4, 2021.

* cited by examiner

*Primary Examiner* — Shaun R Hurley
(74) *Attorney, Agent, or Firm* — Harvest IP Law, LLC

(57) ABSTRACT

The present disclosure relates to a method for manufacturing a hybrid tire cord that utilizes a difference in fineness using a general-purpose industrial filament such as nylon and polyester having high fineness of 200 denier or more relative to a fineness of an aramid filament.

7 Claims, No Drawings

HYBRID TIRE CORD AND METHOD FOR MANUFACTURING THEREOF

CROSS REFERENCE TO RELATED APPLICATION(S)

This application is a National Stages of International Application No. PCT/KR2020/012881 filed on Sep. 23, 2020, claiming the benefit of Korean Patent Application No. 10-2019-0121169 filed on Sep. 30, 2019 with the Korean Intellectual Property Office, the disclosure of which is incorporated herein by reference in its entirety.

TECHNICAL FIELD

The present disclosure relates to a hybrid tire cord that is more easily manufactured in a form covered with aramid and has excellent fatigue performance with uniform physical properties, by utilizing a difference in fineness between general-purpose industrial fibers such as nylon and polyester and aramid filaments, and thus is suitable for use as a high-performance tire material, and a method for manufacturing the same.

BACKGROUND ART

A fiber cord, particularly a fiber cord treated with an adhesive, is widely used as reinforcement for rubber products such as tires, conveyor belts, V-belts, hoses, and so on. The fiber cord may be made of nylon fibers, polyester fibers, rayon fibers, and the like. One of important methods for improving the performance of the final rubber product is to improve the physical properties of the fiber cords which are used as the reinforcement therefor.

As the performance of an automobile and road conditions are improved, driving speeds are getting higher. Thus, many studies have been actively carried out about a tire cord to be used as reinforcement for a tire rubber so as to maintain stability and durability of the tire even during high speed driving.

A tire cord is classified according to the portions used and their functions, i.e., a carcass portion to support the entire tire, a belt portion to support the load and to prevent any deformation which may be caused by high speed driving, and a cap ply portion to prevent any deformation of the belt portion. In order to improve the performance of tires, priority should be given to improving the performance of the reinforcement of each portion, and methods such as material change and structural development are being studied to improve the performance of the reinforcement.

The materials mainly used now for the cap ply are nylon and aramid, and the material mainly used for the carcass material is polyester. Among them, the nylon is used for most kinds of tires since it is less expensive and exhibits excellent adhesiveness before and after fatigue, as compared with other materials. Furthermore, the nylon exhibits high shrinkage stress which the cap ply is required to advantageously support the belt cord during high speed driving. However, the nylon has drawbacks as a material for a cap ply in that a flat spot might be caused due to its low modulus and high changeability between room temperature and high temperature.

The aramid used as the cap ply materials other than nylon exhibits lower shrinkage stress than nylon, but has an excellent creep property and a very high modulus, and exhibits only a small difference in modulus between room temperature and high temperature, whereby it causes little flat spot problem, i.e., tire deformation after long-term parking. Such aramid material is mainly used for high-class tires for which the quality of tire is very important, but the aramid material cannot be used for the general-purpose tires as a practical matter because the material itself is very expensive. Furthermore, since the high modulus of the aramid makes it difficult to expand the tire during the tire forming and curing processes, it is hard to apply the aramid material to the general tires. It also has a disadvantage in that its elongation at break is too low to secure sufficient fatigue resistance, i.e., long-term durability.

To compensate for the aforementioned drawbacks, a hybrid structure has been developed that uses aramid together with general-purpose industrial fibers such as nylon and polyester. Such a hybrid tire code was limitedly applied to existing high-class passenger cars, SUVs, and LT tires. However, recently, the range of use has expanded to general passenger cars and electric vehicles, and the usage thereof trends to increase more and more.

High strength and high modulus are required for hybrid reinforcement to be applied to high-performance tires. In order to satisfy this requirement, aramid was necessarily applied, but aramid has drawbacks in that it has low fatigue performance and poor adhesion performance with rubber. Therefore, there is a need to improve these drawbacks.

Further, conventionally, in order to manufacture a hybrid cord in a form covered with aramid, the method is divided into a step of primarily twisting aramid, a step of primarily twisting nylon or PET, and a step of secondarily twisting the primarily twisted aramid and nylon. Thus, there was a drawback in that the manufacturing method is complicated and the manufacturing method is performed by a batch type, and thus the manufacturing efficiency is low.

DETAILED DESCRIPTION OF THE INVENTION

Technical Problem

It is an object of the present disclosure to provide a hybrid tire cord that improves the characteristics of the existing aramid with low elongation and fatigue performance, and at the same time, improves the low strength and modulus properties of general-purpose molten polymer fibers (nylon, PET, etc.), and a method for manufacturing the same.

It is another object of the present disclosure to provide a hybrid tire cord that can improve the manufacturing efficiency in an easier manner and maintain uniform and excellent physical properties, and thereby can contribute to providing a high-performance tire, and a method for manufacturing the same.

Technical Solution

Provided herein is a hybrid tire cord including an aramid primarily twisted yarn having a first twist direction, nylon or PET primarily twisted yarn having a second twist direction, and an adhesive coated onto the aramid primarily twisted yarn and the nylon or PET primarily twisted yarn, wherein the aramid primarily twisted yarn and the nylon or PET primarily twisted yarn are secondarily twisted each other in a third twist direction, and wherein the nylon or PET primarily twisted yarn is primarily twisted with a nylon or PET filament yarn having a difference in fineness of 200 denier or more higher than the fineness of the aramid filament yarn for forming the aramid primarily twisted yarn.

Also provided herein is a method for manufacturing a hybrid tire cord, including the steps of:
- a first step of primarily twisting an aramid filament yarn in a first direction to form an aramid primarily twisted yarn which is a first primarily twisted yarn;
- a second step of primarily twisting a nylon or PET filament yarn in a second direction to form a nylon or PET primarily twisted yarn which is a second primarily twisted yarn; and
- a third step of secondarily twisting the aramid primarily twisted yarn and the nylon or PET primarily twisted yarn to form a ply yarn,
- wherein the nylon or PET filament yarn uses a nylon or PET filament yarn having fineness of 200 denier or more higher than that of the aramid filament yarn.

Now, a hybrid tire cord having excellent fatigue resistance and high strength characteristics and a manufacturing method thereof according to embodiments of the present disclosure will be described in detail.

Prior to the description, unless otherwise specified throughout this specification, the technical terms used herein are only for reference to specific embodiments and are not intended to limit the present disclosure.

The singular forms "a", "an", and "the" used herein also include plural references unless the context clearly dictates otherwise.

The term "including" or "comprising" as used herein specifies a specific feature, region, integer, step, action, element, and/or component, but does not exclude the presence or addition of a different specific feature, region, integer, step, action, element, component, and/or group.

Further, the terms including ordinal numbers such as "a first", "a second", etc. are used only for the purpose of distinguishing one component from another component, and are not limited by the ordinal numbers. For instance, a first component may be referred to as a second component, or similarly, the second component may be referred to as the first component, without departing from the scope of the present disclosure.

Further, in the present specification, twisting a yarn or filament in a counterclockwise direction is called a Z-direction, and twisting the yarn or filament in a clockwise direction is called an S-direction.

As used herein, the term 'single yarn' refers to a single ply yarn made by twisting a filament in either direction, and a single yarn made by primarily twisting the filament is called a 'primarily twisted yarn'.

The term 'ply yarn' as used herein refers to a yarn made by twisting two or more ply yarns together, which may also be called 'raw cord'.

The term 'fiber cord' as used herein refers to a ply yarn containing an adhesive so that it can be applied to a rubber product firsthand, which may also be called 'dipped cord'. The fiber cord also includes a fabric containing an adhesive, which may be made by weaving a fabric with the ply yarns and then dipping the fabric into an adhesive solution.

The term 'twist number' as used herein refers to the twist number of per 1 m, and a unit of measurement thereof is TPM (Twist Per Meter).

According to one embodiment of the present disclosure, there can be provided a hybrid tire cord including an aramid primarily twisted yarn having a first twist direction, nylon or PET primarily twisted yarn having a second twist direction, and an adhesive coated onto the aramid primarily twisted yarn and the nylon or PET primarily twisted yarn, wherein the aramid primarily twisted yarn and the nylon or PET primarily twisted yarn are secondarily twisted with each other in a third twist direction, and wherein the nylon or PET primarily twisted yarn is primarily twisted with a nylon or PET filament yarn having a difference in fineness of 200 denier or more higher than the fineness of the aramid filament yarn for forming the aramid primarily twisted yarn.

The present disclosure is characterized by including general-purpose industrial fibers such as nylon and polyester and aramid filaments, wherein the general-purpose industrial filament uses a filament having high fineness of 200 de relative to the fineness of the aramid filament.

The hybrid fiber cord of the present disclosure is set to have the same twist number of the primary twist yarn and the secondary twist yarn, but due to the untwisting phenomenon that occurs during the manufacture of the dipped cord, a hybrid fiber cord is provided in which the twist number range of the final dipped cord is within the range of ±30 TPM for general-purpose industrial primarily-twisted yarns, aramid primarily-twisted yarns, and two-ply yarns in which respective primarily twisted yarns are secondarily twisted together.

Further, the hybrid fiber cord is manufactured by a method including a) using a single twister that performs the primary twisting and the secondary twisting simultaneously, e.g., a cable corder, the step of setting the general-purpose industrial filament and aramid to the same twist number and performing the primary twisting and the secondary twisting simultaneously to produce a ply yarn, and b) the step of dipping the ply yarn thus produced in an adhesive solution, and then drying and heat-treating the ply yarn.

That is, in the present disclosure, a first primarily twisted yarn and a second primarily twisted yarn are formed using a first filament yarn and a second filament yarn, and then the first primarily twisted yarn and the second primarily twisted yarn are secondarily twisted in a third direction to provide a ply yarn. Further, the primary twisting and the secondary twisting may be performed simultaneously. At this time, the first primarily twisted yarn may be an aramid primarily twisted yarn, and the second primarily twisted yarn may be a nylon or PET primarily twisted yarn.

The biggest feature of the manufacturing method of the hybrid cord according to the present disclosure is that it increases the fineness of the general-purpose molten polymer fiber, makes the fineness of the aramid relatively lower than that of the general-purpose molten polymer fiber, and simultaneously applies a twist to produce a raw cord. If the raw cord thus produced is heat-treated (adhesive-treated), it can be provided as a final product, i.e., a dip cord. The hybrid cord produced in this manner has a feature that a structure in which aramid covers the molten polymer fiber is naturally formed, the physical properties of the molten polymer fiber are initially expressed on the S-S curve pattern of the cord product to increase the elongation and fatigue performance, and in the middle/latter half, the physical properties of aramid are expressed, and the modulus and strength are high.

In the hybrid cord formed with a difference in fineness according to the present disclosure, an aramid primarily twisted yarn spirally wraps around the nylon or PET. Thus, when measuring the tensile physical properties, the physical properties of nylon or PET are initially expressed, and in the middle or the latter half, the spiral aramid primarily twisted yarn is linearly arranged in the middle or the latter half and at the same time, a force is applied directly to the aramid filament, and the combined physical properties of aramid and nylon or PET are expressed.

Therefore, in the hybrid cord of the present disclosure, fatigue is added to the relatively flexible nylon or PET primarily twisted yarn in a fatigue test in which low stretching and contraction are repeated, thereby exhibiting higher fatigue performance compared to aramid.

Specifically, the present disclosure is characterized in that it does not provide a structure in which aramid forcibly covers the general-purpose polymer fiber as in the conventional case, but provides a hybrid tire cord having a form in which aramid can naturally cover the general-purpose polymer.

Thus, in order to provide a hybrid cord, the present disclosure includes the steps of primarily twisting and secondarily twisting an aramid filament and a nylon or PET filament, wherein the aramid filament can use a filament having fineness of 500 to 1500 denier (de). Further, nylon or PET filaments can be used as general-purpose polymer fibers, and these fibers can use a filament having fineness of 800 to 3000 denier (de).

Further, when forming the primary twisted yarn using the aramid and general-purpose polymer fibers in the present disclosure, the fineness ranges of the two fibers are not overlapped or used in the same category, and the fineness of the general-purpose polymer fiber is set to be relatively high compared to the aramid fiber, thereby providing an aramid primarily twisted yarn and a general-purpose polymer fiber primarily twisted yarn (i.e., nylon or PET primarily twisted yarn).

Preferably, the nylon or PET filament yarn uses a filament set to be higher than 200 denier (de) relative to the aramid filament yarn, whereby a structure in which the aramid naturally surrounds the general-purpose polymer can be formed. At this time, if there is no difference in the fineness of the nylon or PET filament yarn or the fineness is 200 denier or less, in the production of a ply yarn that forms a structure in which aramid surrounds the general-purpose polymer fiber, a separate operation is required to use a ring twister that processes the primary twisting and the secondary twisting in a batchwise manner, or to apply the twist tension of aramid or general-purpose polymer fibers differently. In the yarn twisting process system in which the covering structure is forcibly expressed in this way, the shape in which the aramid wraps the general-purpose polymer is not uniform, which may cause a problem that the physical properties (particularly, elongation at stated load and elongation at break) are not uniform.

In accordance with this method, the aramid primarily twisted yarn is primarily twisted using an aramid filament yarn of 500 to 1500 denier, and the nylon or PET primarily twisted yarn is in the shape of being primarily twisted using a nylon or PET filament yarn of 800 to 3000 denier, and using nylon or PET filament yarn that is 200 denier or more higher than the fineness range of the aramid filament yarn.

In the hybrid tire cord, the second twist direction may be the same as the first twist direction, and the third twist direction may be opposite to the first twist direction. In the hybrid tire cord, the length of the aramid primarily twisted yarn measured after untwisting the secondarily twist (post-untwist) in a hybrid tire cord of a predetermined length may be 1.01 to 1.10 times a length of the nylon or PET primarily twisted yarn.

Additionally, the hybrid tire cord may further include an adhesive coated onto the aramid primarily-twisted yarn and the nylon or PET primarily twisted yarn.

The hybrid fiber cord of the present disclosure may have breaking tenacity of 8.0 to 15.0 g/d as measured by ASTM D885, and elongation at break of 5 to 20% as measured by ASTM D885.

Further, the hybrid tire cord may have dry heat shrinkage of 0.5 to 5.0% as measured by applying a primary load of 0.01 g/denier at 180° C. for 2 minutes.

Further, the hybrid tire cord of the present disclosure exhibits a difference between the maximum value and the minimum value of an elongation at stated load (EASL) within 0.5% as measured according to ASTM D885.

Further, the hybrid fiber cord of the present disclosure has a strength maintenance percentage of 90% or more after a disk fatigue test conducted according to a JIS-L 1017 method of the Japanese Standards Association (JSA).

Meanwhile, according to another embodiment of the present disclosure, there can be provided a method for manufacturing a hybrid tire cord, including: a first step of primarily twisting an aramid filament yarn in a first direction to form an aramid primarily twisted yarn which is a first primarily twisted yarn; a second step of primarily twisting a nylon or PET filament yarn in a second direction to form a nylon or PET primarily twisted yarn which is a second primarily twisted yarn; and a third step of secondarily twisting the aramid primarily twisted yarn and the nylon or PET primarily twisted yarn to form a ply yarn, wherein the nylon or PET filament yarn uses a nylon or PET filament yarn having fineness of 200 denier or more higher than that of the aramid filament yarn.

Hereinafter, the manufacturing method of the hybrid fiber cord of the present disclosure described above will be described in more detail.

The hybrid tire cord of the present disclosure is composed of hybrid fibers, and examples applicable to tires are presented as follows. In addition to the hybrid type in which nylon or PET filament and aramid are mixed as presented below, a hybrid type in which other general-purpose industrial filaments and aramid filaments are mixed can also sufficiently satisfy the physical properties required for tires.

The hybrid fiber cord of the present disclosure can be manufactured by simultaneously performing the primary twisting process for each of the general-purpose industrial filament and aramid and the secondary twisting process of twisting together the general-purpose industrial primarily twisted yarn and the aramid primarily twisted yarn produced by the primary twisting process, dipping the ply yarn produced by the primary and secondary twisting processes in an adhesive solution, and then drying and heat-treating the ply yarn, as set forth in the steps 1 to 3.

In particular, the fineness of the aramid filament and nylon or PET filament used in the present disclosure is applied so that the fineness of the nylon or PET filament is 200 de or higher than the fineness of the aramid filament, which shows the biggest difference from the existing hybrid structure in which the fineness of aramid filament and nylon or PET filament is similarly applied.

Therefore, according to the present disclosure, the first and second steps can be performed using an aramid filament yarn and nylon or PET filament having a difference in fineness as described above to form an aramid primarily twisted yarn and a nylon or PET primarily twisted yarn, respectively, and the aramid primarily twisted yarn and the nylon or PET primarily twisted yarn can be secondarily twisted together to produce a 2-ply yarn.

At this time, the second step is performed simultaneously with the first step, and the third step may be performed continuously with the first and second steps. In particular, since the first, second, and third steps are performed by means of one twister, a high-performance hybrid tire cord having excellent physical properties can be provided by a simpler method. In addition, the method of the present disclosure can improve fatigue performance more effectively as compared with the case of using a conventional twister, and a hybrid tire cord having high strength can be provided.

Further, as described above, in the hybrid tire cord manufactured by the method of the present disclosure, the second direction may be the same as the first direction, and the third direction may be opposite to the first direction.

In the first and second steps, the fineness of the nylon or PET filament is 200 de or more higher than the fineness of the aramid filament, and even if the tension given to each filament during the twisting process is the same, the aramid filament spirally wraps the nylon or PET filament, the length of which may be 1.01 to 1.10 times the length of the nylon or PET filament primarily twisted yarn.

The method of the present disclosure may further include: a step of dipping the ply yarn in an adhesive solution; a step of drying the ply yarn dipped with the adhesive solution by the dipping process; and a step of heat-treating the dried ply yarn.

That is, in order to improve the adhesiveness with a tire, the ply yarn obtained above is dipped into and passed through an adhesive solution, and then dried and heat-treated to complete the manufacture of the hybrid fiber cord of the present disclosure.

The adhesive solution may be, but is not limited to, an RFL (Resorcinol Formaldehyde Latex) solution or an epoxy-based adhesive solution which are typically used in this art as an adhesive solution for a tire cord.

Although the temperature and time of the drying process subsequent to the dipping process depend on the composition of the adhesive solution, it can be performed at 70 to 200° C. for 30 to 120 seconds.

The step of heat-treating the ply yarn can be performed 200 to 250° C. for 30 to 120 seconds.

The adhesive component of the adhesive solution dipped in the ply yarn during the previous step is coated onto the surface of the ply yarn through the drying and heat-treating steps, so that the adhesiveness of the ply yarn with the rubber compositions used for the manufacture of a tire in a subsequent process can be increased.

Although the same twist number is applied to both primary twist and second twist when the hybrid fiber cord of the present disclosure is made, the untwisting phenomenon might occur during the drying step after dipping in an adhesive solution, thereby causing the twist number difference of 15% or less between the primary twist and the second twist.

The hybrid cord provided through such a method has breaking tenacity of 8.0 to 15.0 g/d, elongation at break of 7 to 15%, and dry heat shrinkage of 1.5 to 2.5%, the breaking tenacity and elongation at break being measured according to ASTM D885, and the dry heat shrinkage being measured by applying primary load of 0.01 g/De' at 180° C. for 2 minutes. Further, the hybrid fiber cord of the present disclosure exhibits a strength maintenance percentage of 90% or more after a disk fatigue test conducted according to JIS-L 1017 method of the Japanese Standards Association (JSA).

Advantageous Effects

According to the present disclosure, a hybrid cord covered with aramid can be manufactured more easily by providing a hybrid structure utilizing the difference in fineness between general-purpose polymer fibers and aramid, and a hybrid cord having uniform physical properties and a method for manufacturing the same can be provided.

Further, the present disclosure can manufacture a hybrid in which the aramid is naturally covered through one cable corder twister that performs the primary twist and the secondary twist simultaneously, compared to the conventional batchwise method, thus increasing the manufacturing efficiency. Therefore, the present disclosure does not forcibly manufacture a raw cord in a form covered with aramid, but a structure that is naturally covered by a difference in fineness is formed, so that it has more uniform characteristics in physical properties. In addition, the hybrid tire cord provided in the present disclosure has better fatigue resistance than conventional ones and exhibits high strength, and so it is suitable for use as a material for high-performance tires.

DETAILED DESCRIPTION OF THE EMBODIMENTS

Hereinafter, preferred examples are presented to help understand the present invention, but the following examples are for illustrative purposes only, and it will be apparent to those skilled in the art that various changes and modifications can be made without departing from the scope and spirit of the present invention, and it goes without saying that such changes and modifications fall within the scope of the appended claims.

Example 1

An aramid filament of 1000 de and a PET filament of 2000 de were twisted at a twist number of 300 TPM by means of the cable corder twister. Primary twisting (Z-twist) was performed in a counterclockwise direction, and secondary twisting (S-twist) was performed in a clockwise direction. The primary and secondary twisting were performed simultaneously to produce a hybrid ply yarn (manufacture of raw cord).

The raw cord so produced was primarily dipped into an epoxy-based adhesive solution, then dried at 150° C. for 100 seconds, and then heat-treated at 240° C. for 100 seconds. Then, the primarily dipped and heat-treated raw cord was secondarily dipped into a resorcinol-formaldehyde-latex (RFL) adhesive solution containing 2.0 wt % of resorcinol, 3.2 wt % of formalin (37%), 1.1 wt % of sodium hydroxide (10%), 43.9 wt % of styrene/butadiene/vinylpyridine (15/70/15) latex (41%), and a residual amount of water.

The tension applied to the raw cord during the primary dipping and heat-treatment was controlled so as to become 0.5 kg/cord. The cord containing the RFL solution by the secondary dipping was subjected to secondary heat treatment in the same manner as in the primary dipping, thereby completing the manufacture of a hybrid cord (manufacture of dip cord).

Example 2

A hybrid cord was manufactured in the same manner as in Example 1, except that a hybrid raw cord was manufactured using nylon filaments with different fineness instead of PET filaments, as shown in Table 1.

Comparative Example 1

PET filament and aramid filament were respectively twisted at a twist number of 400 TPM to produce a primary twisted yarn, and then aramid primarily twisted yarn in a form in which the aramid primarily twisted yarn covers the PET primarily twisted yarn was prepared by using a Ring-Twister. In addition, the dipping process and the heat treatment process of the raw cord were carried out in the same manner as in Example 1 to manufacture a hybrid cord.

Comparative Example 2

A hybrid cord was manufactured in the same manner as in Comparative Example 1, except that a hybrid raw cord was manufactured using nylon filaments with different fineness instead of PET filaments, as shown in Table 1.

Experimental Example

The physical properties were measured by the following method, and the results are shown in Table 1 below.

1) Strength, Elongation at Break, Elongation at Stated Load, Tenacity (Breaking Tenacity)

The strength, elongation at break, and elongation at stated load (at 6.8 kg) of the hybrid cord (dipped cord) were measured respectively according to ASTM D885 by applying the tensile velocity of 300 m/min to 10 samples having the length of 250 mm using the Instron Tester (Instron Engineering Corp., Canton, Mass.). Then, the strength, elongation at break, and elongation at stated load (at 6.8 kg) of each sample were divided by the total fineness of the dipped cord to obtain the breaking tenacity (g/d) of the sample. Then, the strength, elongation at break, and elongation at stated load (at 6.8 kg) of the dipped cord were obtained by calculating the averages of the strength, elongation at break, and elongation at stated load (at 6.8 kg) of the 10 samples.

2) Length (Measurement of the Difference in Length of Aramid-PET or Nylon Filament)

The raw cord having a primary twist and a secondary twist was cut to a length of 1 m, then the twist directions of the primary twist and the secondary twist were reversed and untwisted, and then the lengths of the aramid filament and the general-purpose polymer filament (nylon or PET) were measured.

3) Fatigue Performance

After the strength (i.e., strength before fatigue) of a hybrid tire cord was measured, the hybrid tire cord and rubber were cured together to prepare a sample. Then, in accordance with the JIS-L 1017 method of the Japanese Standards Association (JSA), the fatigue was applied to the sample by means of the disc fatigue tester, which repeated the stretching and contracting steps for 8 hours at 80° C. while rotating the sample at 2500 rpm. Subsequently, the rubber was removed from the sample and the strength after fatigue of the hybrid tire cord was measured. Based on the strength before fatigue and the strength after fatigue, the strength retention rate defined by the following Equation 1 was calculated.

Strength retention rate (%)=[Strength after fatigue (kgf)/Strength before fatigue(kgf)]×100     [Equation 1]

Herein, the strengths (kgf) before and after fatigue were obtained respectively by measuring the strength at break of the hybrid tire cord according to ASTM D885, i.e., applying the tensile velocity of 30 m/min to the sample having the length of 250 mm using the Instron Tester (Instron Engineering Corp., Canton, Mass.).

TABLE 1

| Sample | | Comparative Example 1 | Comparative Example 2 | Example 1 | Example 2 |
|---|---|---|---|---|---|
| Structure | Filament yarn for first "primarily" twisted yarn | Aramid 1000 de | Aramid 1000 de | Aramid 1000 de | Aramid 1000 de |
|  | Filament yarn for second "primarily" twisted yarn | PET 1000 de | Nylon 840 de | PET 2000 de | Nylon 2520 de |
| Twist number | TPM | 400 | 400 | 300 | 300 |
| Strength | kgf | 20.4 | 21.4 | 31.8 | 35.6 |
| Tenacity | g/d | 10.2 | 11.6 | 10.6 | 10.1 |
| Elongation at break | % | 8.7 | 9.8 | 8.9 | 14.1 |
| Elongation at stated load @6.8 kgf | % | 2.8 | 4.6 | 2.1 | 5.8 |
| Elongation at stated load (Max.-Min.) | % | 0.8 | 1.2 | 0.2 | 0.3 |
| Difference in length, based on dip cord (Aramid-Nylon or PET) | kgf | Aramid 2.5 cm ↑ | Aramid 5.4 cm ↑ | Aramid 7.5 cm ↑ | Aramid 6.2 cm ↑ |
| Fatigue performance | % | 81.7 | 83.4 | 91.3 | 94.5 |

Looking at the results in Table 1, Examples 1 and 2 of the present disclosure set the fineness of the nylon or PET filament, which is a general-purpose polymer fiber, to be 200 denier or more higher than the fineness of the aramid filament, and then continuously performed the primary twisting and the secondary twisting in one twister, thereby exhibiting equal or greater strength as compared with Comparative Examples 1 and 2. In particular, Examples 1 and 2 showed excellent results in that the difference between the maximum value and the minimum value of the elongation at stated load (@6.8 kgf) measured according to ASTM D885 was within 0.5%, a strength measured according to ASTM D885 was 30 kgf or more, and the aramid filament spirally wrapped around the nylon or PET filament, and thus, the length of the aramid primarily twisted yarn was longer than the length of the nylon or PET lower yarn, and the fatigue performance was 90% or more.

On the other hand, Comparative Examples 1 and 2 are batch-type methods using a conventional ring twister, and in terms of the difference in the fineness of the two fibers used in manufacturing the ply yarn, the fineness of the PET or nylon filament was the same as that of the aramid filament, or fatigue performance was lower than the fineness of the aramid filament, and the overall physical properties were lower than in Examples 1 and 2.

The invention claimed is:

1. A hybrid tire cord comprising
an aramid primarily twisted yarn having a first twist direction,
a nylon or PET primarily twisted yarn having a second twist direction, and
an adhesive coated onto the aramid primarily twisted yarn and the nylon or PET primarily twisted yarn,
wherein the aramid primarily twisted yarn and the nylon or PET primarily twisted yarn are secondarily twisted with each other in a third twist direction, and
wherein the nylon or PET primarily twisted yarn is primarily twisted with a nylon or PET filament yarn having a difference in fineness of 200 denier or more higher than the fineness of the aramid filament yarn for forming the aramid primarily twisted yarn,
wherein the aramid primarily twisted yarn is primarily twisted using an aramid filament yarn of 500 to 1500 denier, and
the nylon or PET primarily twisted yarn is primarily twisted using a nylon or PET filament yarn of 2000 to 3000 denier, and using a nylon or PET filament yarn that is 200 denier or more higher than a fineness range of the aramid filament yarn,
wherein a breaking tenacity and an elongation at break measured according to ASTM D885 are 8.0 to 15.0 g/d and 5 to 20%, respectively, a difference between the maximum value and the minimum value of an elongation at stated load (@6.8 kgf) measured according to ASTM D885 is within 0.5%, and a strength measured according to ASTM D885 is 30 kgf or more.

2. The hybrid tire cord according to claim 1, wherein the second twist direction is the same direction as the first twist direction, and the third twist direction is opposite to the first twist direction.

3. The hybrid tire cord according to claim 1, wherein the length of the aramid primarily twisted yarn measured after untwisting the secondarily twist in a hybrid tire cord of a predetermined length is 1.01 to 1.10 times a length of the nylon or PET primarily twisted yarn.

4. The hybrid tire cord according to claim 1, wherein a strength maintenance percentage after disk fatigue test conducted according to JIS-L 1017 method of the Japanese Standards Association is 90% or more.

5. A method for manufacturing a hybrid tire cord, comprising:
a first step of primarily twisting an aramid filament yarn in a first direction to form an aramid primarily twisted yarn which is a first primarily twisted yarn;
a second step of primarily twisting a nylon or PET filament yarn in a second direction to form a nylon or PET primarily twisted yarn which is a second primarily twisted yarn; and
a third step of secondarily twisting the aramid primarily twisted yarn and the nylon or PET primarily twisted yarn to form a ply yarn,
wherein the nylon or PET filament yarn uses a nylon or PET filament yarn having fineness of 200 denier or more higher than that of the aramid filament yarn,
wherein the aramid primarily twisted var is primarily twisted using an aramid filament yarn of 500 to 1500 denier, and
the nylon or PET primarily twisted yarn is primarily twisted using a nylon or PET filament yarn of 2000 to 3000 denier, and using a nylon or PET filament yarn that is 200 denier or more higher than a fineness range of the aramid filament yarn,
wherein a breaking tenacity and an elongation at break measured according to ASTM D885 are 8.0 to 15.0 g/d and 5 to 20%, respectively, a difference between the maximum value and the minimum value of an elongation at stated load ((6.8 kgf) measured according to ASTM D885 is within 0.5%, and a strength measured according to ASTM D885 is 30 kgf or more.

6. The method for manufacturing a hybrid tire cord according to claim 5, wherein the first to third steps are each performed simultaneously in one twister, respectively,
the third step is performed continuously with the first and second steps,
the second twist direction is the same direction as the first twist direction, and
the third twist direction is opposite to the first twist direction.

7. The method for manufacturing a hybrid tire cord according to claim 5, wherein the method further comprises: a step of dipping the ply yarn in an adhesive solution; a step of drying the ply yarn immersed with the adhesive solution by the dipping process; and a step of heat-treating the dried ply yarn.

* * * * *